June 22, 1943.  E. MARTIN  2,322,303
ENGINE CONTROL MEANS
Filed March 1, 1938

INVENTOR.
Erle Martin
BY Harris G. Luther
ATTORNEY

Patented June 22, 1943

2,322,303

UNITED STATES PATENT OFFICE 2,322,303

ENGINE CONTROL MEANS

Erle Martin, West Hartford, Conn., assignor to United Aircraft Corporation, East Hartford, Conn., a corporation of Delaware Application March 1, 1938, Serial No. 193,273

11 Claims. (Cl. 170—135.6)

This invention relates to improvements in engine control means and has particular reference to means for controlling an aircraft engine driving a controllable pitch aeronautical propeller.

An object of the invention resides in the provision of means for maintaining the engine speed substantially constant at a predetermined or selected value and for simultaneously maintaining the engine power substantially constant at some selected or predetermined value.

A further object of the invention resides in the provision of control means effective to produce a maximum efficiency and economy in the operation of an aircraft engine by causing the engine to operate at a substantially constant intake manifold pressure.

Other objects and advantages will be more particularly pointed out hereinafter or will become apparent as the description proceeds.

In the accompanying drawing in which like reference numerals are used to designate similar parts throughout, there is illustrated a suitable embodiment of what is now considered to be the preferred arrangement of elements for carrying out the invention. The drawing, however, is for the purpose of illustration only and is not to be taken as in any way limiting the invention as set forth in the appended claims.

In the drawing

Figure 1:
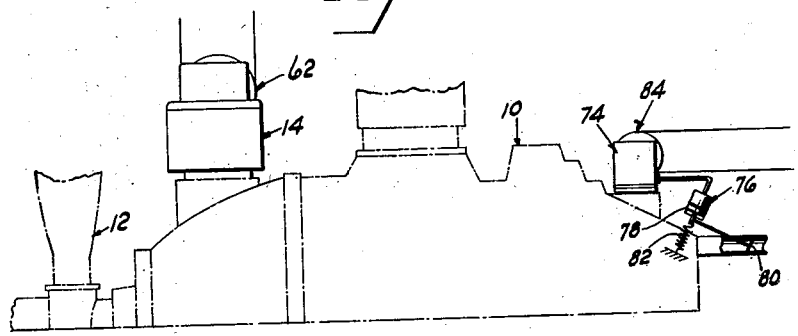
Fig. 1 is a partly schematic view of an aircraft engine and engine driven controllable pitch propeller showing the application thereto of an engine speed and power control arranged according to the invention.

Referring to the drawing in detail, the numeral 10 generally indicates some suitable form of internal combustion engine used for the propulsion of an aircraft. The numeral 12 generally indicates a suitable engine driven controllable pitch propeller such, for example, as is illustrated and described in Pat. No. 2,032,255 issued Feb. 25, 1936, to F. W. Caldwell for Propellers. This propeller may have a hydraulic motor for changing the pitch thereof and a movable valve inserted between the hydraulic motor and a source of hydraulic fluid under pressure to regulate the pitch controlling action of the hydraulic motor. The operation of the motor regulating valve is controlled by a governor, generally indicated at 14 in Fig. 1, and schematically illustrated in detail in one form in Fig. 2, and in a somewhat different form in Fig. 3. This governor 14 is responsive directly or indirectly to engine torque and, in the form shown in Fig. 2, includes an engine torque indicating device, generally indicated at 16, of a form well known to the art. A suitable torque indicating device is particularly illustrated and described in an article entitled "Flight Testing With an Engine Torque Indicator" by Albert Lewis MacClain and Richard S. Buck, published in the February, 1938, issue of the Journal of the Society of Automotive Engineers and may be conveniently operated by the relatively fixed sun gear 18 of a planetary gear reduction train disposed between the engine crankshaft and the drive shaft of the propeller and including, besides the sun gear 18, an annular drive gear 20 and a plurality of planet gears 24 carried by a rotatable cage 22. The sun gear 18 is a reaction gear element and, although restrained against rotation, its tendency to rotate is in direct proportion to the torque transmitted by the engine to the propeller. When used to actuate a torque indicator the sun gear 18 is mounted for free rotation in the gear train but is restrained against rotation by the pistons 26 which are received in the relatively fixed closed cylinders 28 and connected to the sun gear by the connecting rods 30 and radial levers 32 rigidly attached to the sun gear. With this construction, any rotational movement of the sun gear causes a displacement of the pistons 26 in the relatively fixed cylinders 28. Hydraulic fluid under pressure is maintained in the spaces between the piston heads and the closed ends of the respective cylinders, and pressure lines 34 lead from these chambers to a suitable pressure indicating device, such as the gauge 35 so that the engine torque is indicated by the pressure imposed upon the hydraulic fluid by the efforts of the pistons 26 in resisting rotation of the sun gear 18. With proper calibration the pressure gauge may be provided with indicia which read directly in torque units. A branch line 36 conducts the hydraulic fluid under pressure to the interior of a cylinder 38 within which the piston 40 is reciprocable. This piston is urged against the pressure of the hydraulic fluid by a compression spring 42 and between the spring and the piston there is disposed the propeller motor controlling valve, generally indicated at 44. This valve includes a casing 46 which receives, substantially centrally thereof, the end of a hydraulic conduit 48 leading to the propeller pitch changing motor and receives at equally spaced distances upon opposite sides of the longitudinal center thereof the pressure conduit 50 and the drain conduit 52. Within the casing 46 there is a reciprocable valve plunger 54 provided with spaced valve gates 56, 58 and 60 so arranged that a movement of the plunger 54 by the piston 40 incident to an increase in the pressure exerted on the hydraulic fluid by the torque indicator will connect the pressure line 50 with the motor line 48 to admit hydraulic fluid under pressure to the propeller pitch controlling motor to decrease the pitch of the propeller and thereby decrease the load on the engine, and a movement of the plunger 54 in the opposite direction by the spring 42 incident to a decrease in the pressure exerted upon the hydraulic fluid by the torque indicator will connect the drain line 52 with the motor line 48 thereby relieving the pressure of hydraulic fluid in the propeller pitch changing motor permitting the propeller to go to a higher pitch thereby increasing the load on the engine. It is thus apparent that by the operation of the torque controlling governor 14 the engine torque may be maintained substantially constant at a predetermined or selected value by means of the load increasing or decreasing changes in the pitch of the controllable pitch propeller 12.

Figure 2:
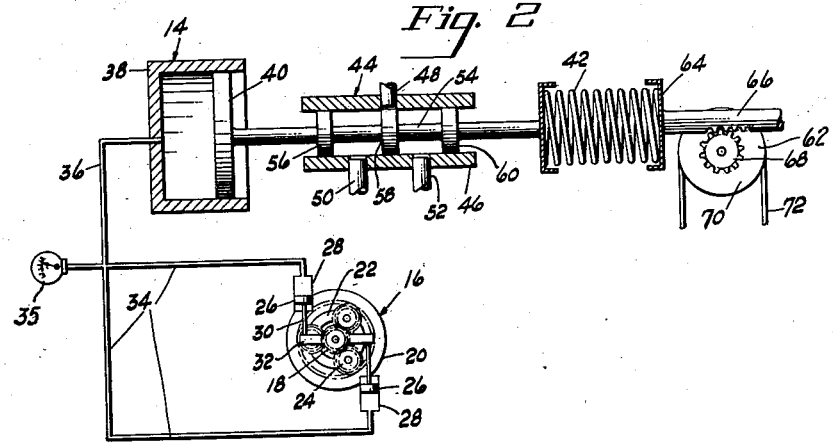
Fig. 2 is a schematic illustration of a torque sensitive governor for regulating the load imposed on the engine by the controllable pitch propeller and, Fig. 3 is a schematic illustration of an alternative form of governor for regulating the load imposed on the engine by the controllable pitch propeller.

The value of the torque which is to be maintained constant by the governor 14 may be determined by the manual control device, generally indicated at 62 in Fig. 1, and which comprises a movable abutment 64 for the end of the spring 42 opposite the valve stem 54, a rack bar 66 connected with the movable abutment 64, a pinion 68 for moving the rack bar and a pulley 70 rotatable by the manually controllable cable 72 for rotating the pinion 68. By varying the loading of the spring 42 through operation of the manual control device, the governor 14 may be adjusted and the value of the torque which it tends to maintain constant may be selected.

The speed controlling governor is generally indicated at 74 in Fig. 1. This governor is an extremely sensitive centrifugal type governor, positively driven by the engine through a suitable gear train and may be of the type such as is produced commercially by the Woodward Governor Company of Rockford Illinois and designated type SG and described in the Woodward Governor Company's bulletin SG-B. The governor 74 operates a valve, not illustrated, disposed between a source of hydraulic fluid under pressure and the hydraulic servo motor 76, the piston 78 of which is operatively connected with the throttle valve 80 and resiliently resisted in its throttle closing movements by the coiled compression spring 82. Since the governor 74 is made extremely sensitive to speed changes of the engine and movement of the throttle valve has an almost instantaneous effect in changing the speed of the engine, the engine speed may be controlled within very narrow limits by the action of the governor 74. This governor may be adjusted by a suitable manual control, as generally indicated at 84, so that the engine speed may be manually regulated by the pilot. Besides being exceptionally sensitive to small speed variations, the governor 74 should have an unusually wide range of speed adjustment so that, by adjusting the governor, the engine can be caused to operate at its idling speed of three or four hundred revolutions per minute for example, at its maximum safe operating speed of 24 or 25 hundred revolutions per minute for example, and at any operating speed therebetween. Also, if desired, the speed governors of the various engines in a multi-motored airplane may be interconnected by some suitable form of synchronizing device so that upon the manual adjustment of one governor all of the engine will be caused to operate at the speed for which the single governor is adjusted.

The improved arrangement utilizing both a speed responsive throttle governor and a torque responsive propeller governor has a number of advantages over existing forms of engine controlling apparatus of which the following are thought to be particularly important. It has been found that none of the controllable pitch propellers now in use has a sufficient rapidity of pitch changing action to constitute at all times an accurate control for engine speed. While effective to maintain the engine speed substantially constant, owing to a certain amount of unavoidable inertia of the moving parts of the propeller and the necessary restriction of the fluid passages in the cases of hydro-controllable propellers and the excessive ratio of the reduction gears in electro-controllable propellers, there is unavoidable a slight lag between the engine speed change and the corrective action of the controllable pitch constant speed propeller. With the present arrangement an excessively high rate of pitch change of the propeller is not required since the throttle controlling governor will act immediately to correct a divergence in engine speed and will then follow up the pitch changing action of the propeller as the torque responsive governor changes the propeller pitch to correct the divergence in engine torque due to the speed correcting action of the throttle governor. Thus with the two governors cooperating, the speed of the engine is maintained substantially constant and the momentary fluctuations in the engine power are corrected by the pitch changing action of the propeller without overcorrection and consequent hunting. For this reason the combination of speed responsive throttle governor and torque responsive propeller governor gives a much better constant speed operation and renders it possible to more nearly synchronize the speed of two or more engines in a multi-engine aircraft. A further advantage is that in acrobatic maneuvers in which the load on the engine is suddenly changed from a very high power load to a reversed load as for instance, when a pursuit plane is quickly changed from a steep climb to a correspondingly steep dive, overspeeding of the engine in the relatively brief interval required to change the pitch of the propeller from the relatively flat climbing pitch to the relatively steep diving pitch, is avoided by the action of the speed governor in immediately reducing the engine power as the engine tends to speed up. Other advantages will be apparent to those skilled in the art upon an inspection of the accompanying illustrative drawing and the above description.

Figure 3:
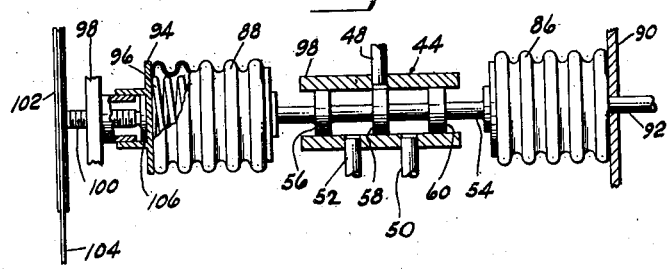

The alternative form of propeller pitch controlling governor, illustrated in Fig. 3, depends for its action upon changes in the intake manifold pressure of the propeller driving engine and is used in combination with the speed responsive throttle governor 74 in substantially the same manner as is the torque responsive governor 14 described above. In this modified form of propeller pitch governor, the propeller pitch controlling valve 44 is disposed between two oppositely acting expansible chamber devices in the form of two sealed "Sylphons" or bellows 86 and

88. The movable ends of these two oppositely acting expansible chamber devices are operatively connected to the opposite ends of the valve stem 54 in such a manner that expansion and contraction of the expansible chambers will move the valve stem in the casing 98 to control the connection of the propeller line 48 with the pressure line 50 or the drain line 52 in the manner described above. The bellows 86 has its fixed end rigidly secured to a fixed abutment 90 and from this fixed end a tube 92 extends, which tube pneumatically connects the interior of the bellows 86 with the interior of the engine intake manifold. The bellows 88 has its relatively fixed end secured to an adjustable abutment 94 and contains a coiled compression spring 96 which acts to oppose expansion of the bellows 86. The bellows 88 is hermetically sealed and together with the spring 96 serves as a pressure compensating device for the bellows 86 so that the bellows 86 will expand or contract the same amount in response to the same changes in the internal pressure therein regardless of the changes in pressure of the surrounding atmosphere incident to changes in barometric pressure or in the altitude at which the device is carried by the airplane. The adjustable abutment 94 is carried upon a fixed abutment 98 through which is threaded a screw 100 rotatable by the pulley 102 controlled by the manually operable cable 104. The end of the screw 100 opposite the pulley 102 bears against the adjustable abutment 94, as indicated at 106, so that rotation of the pulley 102 by the cable 104 will change the loading on the spring 96 and thereby change the adjustment of the manifold pressure responsive governor. It is a fact well-known to those skilled in the art that, when operating at a constant speed, the torque developed by an internal combustion engine is substantially directly proportional to the pressure existing in the engine intake manifold. It is, therefore, apparent that the manifold pressure responsive governor, illustrated in Fig. 3, may be substituted for the governor directly responsive to engine torque illustrated in Fig. 2 and that, when used in combination with the throttle controlling speed governor 74, the manifold pressure responsive governor controlling the pitch of the propeller 12 will provide the same advantages in operation as the direct torque responsive governor as described above.

With either of the above described arrangements the engine torque will be maintained substantially constant at a predetermined or selected value and the engine speed will be maintained substantially constant at a predetermined or selected value. With the described condition of constant torque and constant speed, it is obvious that the engine power will be maintained substantially constant so that the engine may be operated as a constant power plant and may consequently be operated at the maximum efficiency and economy. The torque value may be manually regulated and the speed may be manually regulated independently of the torque regulation to provide the proper engine propeller relations for various operating conditions, and the engine will be at all times restrained from overspeeding without the necessity of providing an instantaneously acting controllable pitch propeller.

While there has been illustrated and described a suitable construction and arrangement of elements for disclosing the invention, it is to be understood that the invention is in no way limited to the particular construction and arrangement so illustrated and described but that such changes in the size, shape and arrangement of the various parts may be resorted to as come within the scope of the appended claims.

Having now described the invention so that others skilled in the art may clearly understand the same what it is desired to secure by Letters Patent is as follows:

1. In combination with an aircraft engine having a device for varying the charge supplied to said engine, and a controllable-pitch propeller driven by said engine, means for maintaining the torque and speed of said engine substantially constant at preselected values comprising, a speed governor driven by said engine and operatively connected with said charge varying device to maintain the speed of said engine substantially constant at a speed predetermined by the speed setting of said governor, mechanism operatively connected with said engine and having an element movable solely in response to variations in engine torque from a predetermined torque value, and mechanism operatively connected with said propeller and actuated by said movable element to automatically return the engine torque to said predetermined torque value by decreasing the pitch of said propeller when the torque exceeds said selected value and increasing the propeller pitch when the torque falls below said selected value until the charge varying speed change thereby imposed on said governor effects a torque correcting variation in the charge supplied to said engine.

2. In combination with an aircraft engine having a device for varying the charge supplied to the engine, and a controllable-pitch propeller driven by said engine, means for maintaining the torque and speed of said engine substantially constant at preselected values comprising, a speed governor driven by said engine and operatively connected with said charge varying device to maintain the speed of said engine substantially constant at a speed value predetermined by the speed setting of said governor, a device operatively connected with said engine and having an element movable solely in response to variations in engine torque from a selected torque value, mechanism operatively connected with said propeller and actuated by said movable element to automatically return the engine torque to said predetermined torque value by decreasing the pitch of said propeller when the torque exceeds said selected value and increasing the propeller pitch when the torque falls below said selected value until the charge varying speed change thereby imposed on said governor effects a torque correcting charge variation, and a manually actuatable adjusting means operatively associated with said pitch changing means for selecting the torque value which said pitch changing means acts to maintain against substantial variation.

3. In combination with an aircraft engine having a device for varying the charge supplied to said engine, and a controllable-pitch propeller driven by said engine, a speed governor driven by said engine and operatively connected with said charge varying device to maintain the speed of said engine substantially constant at a selected value, manually actuatable adjusting means operatively associated with said speed governor for adjusting said governor to select the speed maintained substantially constant thereby, a device operatively connected with said engine and having an element movable in response to variations in engine torque from a selected torque value, means actuated by said movable element to decrease the pitch of said propeller when the torque exceeds said selected value and to increase the propeller pitch when the torque falls below said selected value to thereby impose a charge varying speed change on said governor at a rate slower than the speed change effected by said charge varying speed governor and effect a torque correcting charge variation, and manually actuatable adjusting means operatively associated with said pitch changing means for selecting the torque value which said pitch changing means acts to maintain.

4. In combination with an engine having a throttle and a controllable-pitch propeller driven by said engine, means for maintaining the speed and torque of said engine substantially constant at selected values comprising, a speed responsive governor driven by said engine and operatively connected with said throttle to maintain the speed of said engine substantially constant at a selected rate by moving said throttle, mechanism operatively associated with said engine having an element movable solely in response to variations of engine torque from a selected torque value, a spring opposing movements of said element in one direction, and a servo device interposed between said element and said spring and operatively connected with said propeller to automatically return the engine torque to said selected value by decreasing the propeller pitch when the engine torque exceeds said selected torque value and increasing the propeller pitch when the engine torque falls below said selected torque value until the throttle adjustment thereby imposed on said governor effects a torque correcting variation, said servo device having a neutral position which it occupies when the engine torque is at said selected torque value and in which it restrains said propeller against pitch change.

5. In combination with an engine having a throttle and a controllable-pitch propeller driven by said engine, means for maintaining the torque and speed of said engine substantially constant at a preselected value comprising, a speed responsive governor driven by said engine and operatively connected with said throttle to maintain the speed of said engine substantially constant at said selected rate by moving said throttle, a device operatively associated with said engine and having hydraulic pump and motor piston elements movable in response to variations of engine torque from said selected torque value, a spring opposing movement of said motor piston elements in one direction, a movable abutment for one end of said spring, manually operable means for moving said abutment to change the load on said spring and thereby select the torque value, and a control device interposed between said motor piston elements and said spring and operatively connected with said propeller to decrease the propeller pitch when the engine torque exceeds the selected value and increase the propeller pitch when the engine torque falls below said selected value.

6. In combination with an engine having a throttle and a controllable-pitch propeller driven by said engine, a speed responsive governor driven by said engine and operatively connected with said throttle to maintain the speed of said engine substantially constant at a selected rate by moving said throttle, a device operatively associated with said engine and having an element movable in response to variations of engine torque from a selected value, a spring opposing movement of said element in one direction, a motor carried by said propeller for changing the propeller pitch, and a motor control device interposed between said element and said spring and operatively connected with said motor for controlling said motor to decrease the propeller pitch when the engine torque exceeds said selected value and increase the propeller pitch when the engine torque falls below said selected value, said motor control device having a neutral position which it occupies when the engine torque is at said selected value and in which it restrains said motor against changing the propeller pitch.

7. In combination with an engine having a throttle and a controllable-pitch propeller driven by said engine, means for maintaining the torque and speed of said engine substantially constant at preselected values comprising, a speed responsive governor driven by said engine and operatively connected with said throttle to maintain the speed of said engine substantially constant at a selected rate by moving said throttle, a motor interposed between and operatively connecting said governor and said throttle, a device operatively associated with said engine and having an element movable in response to variations of engine torque from a selected value operatively connected with said propeller to automatically return said torque to said selected torque value by decreasing the propeller pitch when the engine torque exceeds said selected value and increasing the propeller pitch when the engine torque falls below said selected value until the throttle adjusting speed change thereby imposed on said governor effects a torque correcting engine power variation, and a servo-motor interposed between and operatively connecting said movable element and said propeller for changing the propeller pitch in response to movements of said movable element, said servo-motor having a neutral position which it occupies when the engine torque is at said selected torque value and at which no substantial pitch change of said propeller occurs.

8. In combination with an engine having a charge varying device and a controllable-pitch propeller driven by said engine, means for maintaining the engine speed and torque substantially constant at predetermined values comprising, a device having an element movable solely in response to variations of engine torque from said predetermined torque value, mechanism operatively connected with said propeller and actuated by said movable element to increase the pitch of said propeller when the torque is below said predetermined torque value and decrease the propeller pitch when the torque is above said predetermined torque value, said mechanism having a neutral position in which it is effective to discontinue propeller pitch change only when the engine torque is substantially at said predetermined torque value, and an engine driven speed governor operatively connected with said charge varying device to maintain the engine speed substantially constant at said predetermined speed value.

9. In combination with an aircraft engine having a device for varying the charge supplied to said engine, and a controllable-pitch propeller driven by said engine, means for maintaining the torque and speed of said engine substantially constant at predetermined values comprising, a speed governor driven by said engine and operatively connected with said charge varying device to maintain the speed of said engine substantially constant at a speed predetermined by the speed setting of said governor, mechanism operatively connected with said engine and having an element movable solely in response to variations in engine torque from a predetermined torque value, and mechanism operatively connected with said propeller and actuated by said movable element to automatically return the engine torque to said predetermined torque value by decreasing the pitch of said propeller when the torque exceeds said selected value and increasing the propeller pitch when the torque falls below said selected value until the charge varying speed change thereby imposed on said governor effects a torque correcting variation in the charge supplied to said engine, said mechanism including a device responsive to changes in the manifold pressure of said engine operatively connected with said movable element for moving the same.

10. In combination with an aircraft engine having a device for varying the charge supplied to said engine, and a controllable-pitch propeller driven by said engine and having pitch changing mechanism, a speed governor driven by said engine and operatively connected with said charge varying device to maintain the engine speed substantially constant at a selected value, and means responsive to engine torque only operatively associated with said engine, mechanism connecting said torque responsive means with the pitch changing mechanism of said controllable-pitch propeller, said means and mechanism acting, at a rate slower than the rate at which said speed governor operates, to impose charge varying speed changes on said speed governor by changing the propeller pitch, whereby said speed governor acts to maintain the engine speed substantially constant and closely follows the pitch changing action of said torque variation responsive means to correct torque variations by corresponding variations in the charge supplied to said engine.

11. In combination with an engine having a throttle and a controllable-pitch propeller driven by said engine, means for maintaining the torque and speed of said engine substantially constant at preselected values comprising, a speed responsive governor driven by said engine and operatively connected with said throttle to maintain the speed of said engine substantially constant at said selected rate by moving said throttle, a non-rotatable device operatively associated with said engine and having an element movable in response to variations of engine torque from said selected torque value, a spring opposing movement of said element in one direction, a movable abutment for one end of said spring, manually operable means for moving said abutment to change the load on said spring and thereby select the torque value, and a control device interposed between said element and said spring and operatively connected with said propeller to decrease the propeller pitch when the engine torque exceeds the selected value and increase the propeller pitch when the engine torque falls below said selected value said control device having a neutral position which it occupies when the engine torque is at said preselected value and in which it restrains said propeller against pitch change.

ERLE MARTIN.